United States Patent
Björkengren et al.

(10) Patent No.: US 8,204,217 B2
(45) Date of Patent: Jun. 19, 2012

(54) LIGHTWEIGHT STREAMING PROTECTION BY SEQUENCE NUMBER SCRAMBLING

(75) Inventors: Ulf Björkengren, Bjärred (SE); Stefan Ekenberg, Lund (SE)

(73) Assignee: Telefonaktiebolaget LM Ericsson (publ), Plan-les-Ouates (CH)

( * ) Notice: Subject to any disclaimer, the term of this patent is extended or adjusted under 35 U.S.C. 154(b) by 727 days.

(21) Appl. No.: 12/361,211

(22) Filed: Jan. 28, 2009

(65) Prior Publication Data

US 2010/0189257 A1 Jul. 29, 2010

(51) Int. Cl.
*H04L 9/00* (2006.01)
(52) U.S. Cl. ......................................................... 380/28
(58) Field of Classification Search .................... 380/28
See application file for complete search history.

(56) References Cited

U.S. PATENT DOCUMENTS

| | | | |
|---|---|---|---|
| 5,319,712 | A | 6/1994 | Finkelstein et al. |
| 5,321,748 | A | 6/1994 | Zeidler |
| 5,351,300 | A | 9/1994 | Quisquarter et al. |
| 5,757,922 | A | 5/1998 | Shiroshita |
| 5,835,602 | A | 11/1998 | Lang |
| 6,470,015 | B1 | 10/2002 | Koga et al. |
| 6,957,349 | B1 | 10/2005 | Yasukura |
| 7,221,761 | B1 | 5/2007 | Deshpande et al. |
| 2008/0137851 | A1 | 6/2008 | Shen-Orr et al. |
| 2008/0267409 | A1 | 10/2008 | Raike |
| 2008/0313458 | A1 | 12/2008 | Fascenda |

FOREIGN PATENT DOCUMENTS

| | | |
|---|---|---|
| EP | 0779727 A2 | 6/1997 |
| EP | 1 289 225 * | 3/2003 |
| EP | 1289225 A2 | 3/2003 |
| WO | 0018122 A1 | 3/2000 |

OTHER PUBLICATIONS

Li et al., "The Case for Multipath Multimedia Transport overWireless Ad Hoc Networks", 2004, IEEE Computer Society, pp. 1-10.*
Jie et al., "A Protection Scheme Based on Online Encryption for Streaming Media", 2008, IEEE, pp. 165-170.*
Almasalha et al., "Secure Multimedia Transmission over RTP", 2008, IEEE Computer Society, pp. 404-411.*
Stuedi et al., "SymPhone: Design and Implementation of a VoIP peer for Symbian mobile phones using Bluetooth and SIP", Sep. 29, 2006, ACM, pp. 63-70.*
Hallivuori, V. "Real-Time Transport Protocol (RTP) Security." Helsinki University of Technology, Seminar on Network Security, 2000. Available at: http://kotiweb.kotiportti.fi/vhallivu/files/rtp_security.pdf.
Schulzrinne, H. et al. "RTP: A Transport Protocol for Real-Time Applications." Internet Engineering Task Force, Network Working Group, Request for Comments: 3550, Obsoletes: 1889, Category: Standards Track, Jul. 2003.

* cited by examiner

*Primary Examiner* — Matthew Smithers
(74) *Attorney, Agent, or Firm* — Coats & Bennett, P.L.L.C.

(57) ABSTRACT

Methods and apparatus for securely streaming multimedia packets, such as RTP packets, are disclosed, in which the payloads of the packets are shuffled. This reordering is performed using a shuffling function that depends on sequence numbers associated with each of the packets, a pre-determined group size N, and a pre-determined initialization value; in some embodiments this shuffling function comprises a cryptographic hashing function or other one-way function. A receiving device may reverse the shuffling, using a similar shuffling function, if the pre-determined group size N and the pre-determined initialization value are known.

34 Claims, 8 Drawing Sheets

| TS(x) | TS(x+1) | TS(x+2) | TS(x+3) | TS(x+4) | TS(x+5) | TS(x+6) |
|---|---|---|---|---|---|---|
| P(x) | P(x+1) | P(x+2) | P(x+3) | P(x+4) | P(x+5) | P(x+6) |

310 — TS row
320 — P row

FIG. 3B

| TS(x) | TS(x+1) | TS(x+2) | TS(x+3) | TS(x+4) | TS(x+5) | TS(x+6) |
|---|---|---|---|---|---|---|
| $SN_0$ | $SN_0+1$ | $SN_0+2$ | $SN_0+3$ | $SN_0+4$ | $SN_0+5$ | $SN_0+6$ |
| P(x+2) | P(x+4) | P(x+5) | P(x+1) | P(x+6) | P(x+3) | P(x) |

LIGHTWEIGHT STREAMING PROTECTION BY SEQUENCE NUMBER SCRAMBLING

TECHNICAL FIELD

The present invention generally relates to the transmission and reception of multimedia data packets, and more particularly relates to the shuffling of multimedia packets in a streaming transmission to prevent unauthorized use of the multimedia data.

BACKGROUND

Multimedia data, whether audio, video, or both, is commonly transmitted as "streaming" media, such that an end user device can begin decoding the multimedia data as the data is downloaded and thus begin the presentation of an audio and/or video program to the device's user without waiting for a transfer of the complete program. As with other media delivery techniques, content providers are very concerned with the application of appropriate digital rights management (DRM) to streaming media, for protecting against unauthorized use of the multimedia data.

Conventional solutions to the protection of multimedia streams, whether the streams are unicast (i.e., transmitted to a single user), multicast (i.e., transmitted to two or more specifically targeted users), or broadcast, typically involve encryption of the streamed media, and may also include a secure key provisioning solution. The keys used for the encryption and authentication may remain the same for a complete session, or they can be refreshed regularly during the session. Some solutions also implement a key hierarchy, with long-term and short-term keys.

The stream decryption and key management required in these systems present a computational burden to the end systems. This may be particularly problematic in portable devices, where available computing power is limited, and/or in circumstances where several media streams are processed simultaneously.

SUMMARY

Instead of using conventional stream encryption approaches, various embodiments of the present invention instead re-order, or "shuffle," the payloads of streaming multimedia packets such as RTP packets. This reordering is performed using a shuffling function that depends on sequence numbers associated with each of the packets, a pre-determined group size N, and a pre-determined initialization value; in some embodiments this shuffling function comprises a cryptographic hashing function or other one-way function. A receiving device may reverse the shuffling, using a similar de-shuffling function, if the pre-determined group size N and the pre-determined initialization value are known. Thus, these values may be transmitted to the receiving device over a secure connection in some embodiments.

With this approach, continuous encryption and decryption of the media stream data is eliminated and replaced by packet-level scrambling and descrambling operations, with only one or a few encryption/decryption operations needed for processing a small set of scrambling setup data. This approach considerably reduces the computational load, but a reasonably high protection level may still be achieved.

An exemplary method for transmitting multimedia data thus comprises, for a first group of media data elements in a real-time sequence and having a pre-determined group size N, generating a first series of N sequential sequence numbers and re-ordering the first group of media data elements from the real-time sequence into a first output sequence according to a shuffling function that depends on the sequence numbers, the pre-determined group size N, and a pre-determined initialization value. Transmission sequence identifiers that correspond to the sequential sequence numbers are assigned to the re-ordered media data elements, according to the first output sequence; these transmission sequence identifiers may be identical to the N sequential sequence numbers in some embodiments. The re-ordered media data elements and the corresponding transmission sequence identifiers are then transmitted to a second communication device, where they may be de-shuffled using a corresponding de-shuffling function and rendered with an appropriate user interface device and/or software multimedia application.

In some embodiments, the shuffling function comprises a cryptographic function, such as a cryptographic hashing function. In some of these embodiments, re-ordering the first group of media data elements comprises, for at least a first one of the media data elements, calculating a hashing input value as a function of a first one of the sequence numbers and the pre-determined initialization value, and computing a hash output value from the hashing input value, using a cryptographic hashing algorithm. An offset value is then calculated, based on the hash output value and the pre-determined group size N, and a position in the output sequence for the first one of the media data elements is determined, based on the offset value.

In some of these embodiments, calculating the hashing input value comprises combining the first one of the sequence numbers and the pre-determined initialization value with an exclusive-OR operation to obtain the hashing input value; in these and other embodiments calculating the offset value may comprise computing the modulo of the hash output value, using the group size N as the divisor. In these and in still other embodiments, determining a position in the output sequence for the first one of the media data elements based on the offset value may comprise adding the offset value to the first one of the sequence numbers to obtain a second sequence number and allocating to the first one of the media data elements a first position in the output sequence that corresponds to the second sequence number, if the first position has not already been allocated, and otherwise allocating a next available position.

The previously described techniques may be repeated for subsequent groups of media data elements, including for a second group of N media data elements immediately succeeding the first group of media data elements in the real-time sequence. In some of these embodiments, a second series of N sequential sequence numbers is generated for a second group of N media data elements immediately succeeding the first group, such that the second series of N sequence numbers immediately succeeds the first series of sequential sequence numbers if none of the resulting sequential numbers exceeds a predetermined maximum sequence number; otherwise sequential numbers beginning at a predetermined initial sequence number are generated for the second group of media data elements.

Corresponding methods for de-shuffling received multimedia packets shuffled according to one or more of the above embodiments may be implemented on a client device. One such exemplary method comprises receiving a series of media data elements from a second communication device, each media data element having a corresponding transmission sequence identifier, and identifying a first group of the media data elements, using the transmission sequence identifiers and a pre-determined group size. The first group of media data elements are then re-ordered from a first sequence corresponding to the transmission sequence identifiers to a re-ordered sequence, according to a de-shuffling function that depends on the transmission sequence identifiers, the pre-determined group size, and a pre-determined initialization value. The de-shuffled media data elements are then rendered in the re-ordered sequence.

In some embodiments of the previous method, identifying a first group of the media data elements comprises identifying media data elements for which dividing sequence numbers corresponding to the transmission sequence identifiers by the pre-determined group size yields a quotient having an integer portion equal to a pre-determined group number. In these and other embodiments, re-ordering the first group of media data elements comprises, for a first one of the media data elements: calculating a hashing input value as a function of the pre-determined initialization value and a sequence number corresponding to the transmission sequence identifier for the first one of the media data elements; computing a hash output value from the hashing input value, using a cryptographic hashing algorithm; calculating an offset value based on the hash output value and the pre-determined group size N; and determining a position in the re-ordered sequence for the first one of the media data elements, based on the offset value.

In some embodiments, calculating the hashing input value may comprise combining the pre-determined initialization value and the sequence number corresponding to the transmission sequence identifier for the first one of the media data elements, using an exclusive-OR operation, to obtain the hashing input value. In some embodiments, calculating the offset value may comprise computing the modulo of the hash output value, using the pre-determined group size as the divisor. In some embodiments, determining a position in the re-ordered sequence for the first one of the media data elements based on the offset value may comprise adding the offset value to the sequence number for the first one of the media data elements to obtain a second sequence number and allocating to the first one of the media data elements a first position in the re-ordered sequence that corresponds to the second sequence number, if the first position has not already been allocated, and otherwise allocating a next available position. In various of the above embodiments, encrypted multimedia session data is received by the client device and decrypted to determine the pre-determined group size N and the pre-determined initialization value.

Further embodiments of the present invention include a multimedia server device that includes one or more processing circuits configured to carry out one or more of the disclosed shuffling techniques, as well as a client device with one or more processing circuits configured to receive and de-shuffle multimedia data elements that have been re-ordered according to one of the shuffling procedures here. Of course, those skilled in the art will appreciate that the present invention is not limited to the above features, advantages, contexts or examples, and will recognize additional features and advantages upon reading the following detailed description and upon viewing the accompanying drawings.

DETAILED DESCRIPTION

In the discussion that follows, various aspects of the present invention are described in the context of a multimedia streaming system employing the commonly-used media streaming protocol known as RTP, which is described in RFC 3550, "RTP: A Transport Protocol for Real-Time Applications," by H. Schulzrinne, et al., July 2003 (available at http://www.faqs.org/rfcs/rfc3550.html). Those skilled in the art will appreciate that this document actually describes two linked protocols, the real-time protocol (RTP) for carrying media data with real-time properties, and the RTP control protocol (RTCP), which monitors quality of service and carries information about session participants. Those skilled in the art will further appreciate that RTP is designed to allow tailoring of the protocol for specific applications, such as through the use of application-specific "profiles." Accordingly, some embodiments of the present invention may employ RTP, with or without the use of one or more profiles specific to the shuffling techniques described herein. However, the inventive techniques described herein may also be applied in other media streaming contexts where RTP is not used. Thus, references herein to RTP and related protocols are meant to be illustrative, and not limiting.

Figure 1:
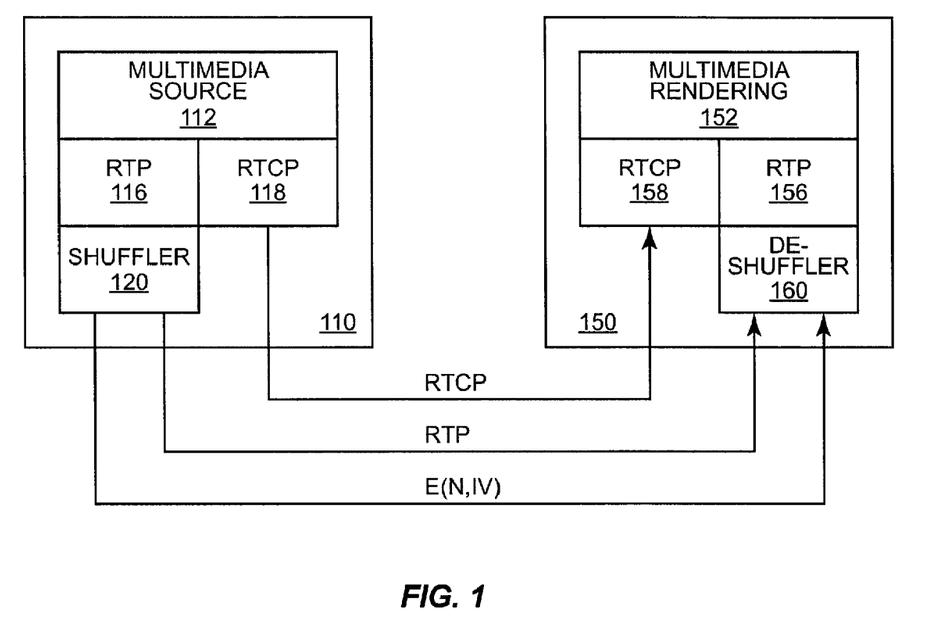
FIG. 1 is a simplified block diagram of a multimedia streaming system according to some embodiments of the present invention.

FIG. 1 illustrates an exemplary multimedia streaming system that includes a streaming multimedia server device 110 and a multimedia client device 150. The multimedia server 110 includes a multimedia source 112, which may comprise a stored audio and/or video data file, a "live" audio and/or video data feed, a streaming data feed obtained from another device, or the like. The multimedia source 112 provides "chunks" of media data, called "media data elements" herein, for packaging into RTP packets by RTP unit 116, according to conventional means. Each media data element may comprise, for example, 20 milliseconds of encoded audio data, or an encoded video frame, and is accompanied by or associated with timing data, which is used to generate a timestamp that is included in the header of each RTP packet. The timestamp, which should generally reflect the sampling instant corresponding to the first bits in the RTP packet payload, is used by the remote client device 150 to reconstruct the timing for the media stream, so that the multimedia can be properly rendered (e.g., using multimedia rendering unit 152, which may comprise one or more audio speakers, a display, or the like). The RTP packets also include a sequence number (in the header of each RTP packet), which in conventional systems is used at the receiving end of the media stream to detect packet loss and to restore packet sequence in the event that one or more packets are delivered out of order. RTCP unit 118 handles session control and quality-of-service functions according to the RCTP specifications.

In a conventional media streaming system, the RTP packets formed as above are transmitted over a network to one or more client devices, unpackaged by a corresponding client RTP function (such as RTP unit 156), and decoded for playback via a media rendering device such as an audio output or video display. As is well known to those skilled in the art, the streaming client typically includes a buffer in which several received packets are held before decoding and rendering, so that variations in packet delay can be accommodated with little or no effect on the playback quality.

In contrast to a conventional streaming media server, however, the exemplary streaming media server 110 of FIG. 1 includes a shuffler 120 which "shuffles" (i.e., re-orders) the payloads of RTP packets before the packets are transmitted to media client device 150. Thus, as will be described in further detail below, shuffler 120 extracts media data elements from assembled RTP packets, re-orders the media data elements, and re-inserts the re-ordered media data elements, along with corresponding transmission sequence identifiers, into the RTP packets.

After their payloads are shuffled, the RTP packets are then transmitted to the streaming media client device 150. De-shuffler 160 reverses the shuffling process, re-ordering the media data element payloads into their original sequence before supplying the RTP packets to RTP unit 156. Once the packet payloads have been "de-shuffled" (i.e., restored to their original order), RTP unit 156 (working in conjunction with RTCP unit 158), un-packages the RTP packets according to conventional means and supplies the media data elements to multimedia rendering unit 152 for playback.

Those skilled in the art will appreciate that media streaming client device 150 may comprise a general-purpose computer, a portable device such as a mobile telephone or personal digital assistant (PDA) or any other network-enabled device programmed or otherwise configured to receive and play back streaming media. Likewise, multimedia server device 110 may comprise a special-purpose server configured to simultaneously provide many media streams to several client devices (using unicast, multicast, or broadcast techniques), in some embodiments, or may comprise any other network-enabled device with access to multimedia data and appropriately programmed to provide a media stream to at least one streaming media client.

In the embodiment pictured in FIG. 1, media streaming server 110 initially packages multimedia data elements into RTP packets in the order that they are received. The shuffling unit in these embodiments operates on a group of these assembled RTP packets, effectively "reaching in" to the packets, extracting the multimedia data elements, and moving each multimedia data element to another RTP packet in the group according to a shuffled order. This arrangement is also generally compatible with the existing RTP/RTCP specifications; the shuffling (and corresponding de-shuffling) functions may be regarded as a particular type of "RTP Translator", which is a system partitioning that is already recognized by the RTP specifications. (RTP Translators are commonly used to encrypt/decrypt RTP payloads or to transcode the payloads from one media format to another. Unlike some of these RTP Translators, however, a shuffling or de-shuffling RTP Translator implementing the techniques described herein processes RTP packets in groups, rather than individually.)

Those skilled in the art will appreciate that configurations other than that pictured in FIG. 1 are possible, however. For instance, in another embodiment of a media streaming server 110, the logic for the packet order scrambling and descrambling is handled in a functional block situated between the RTP function and the media source or media rendering functions. With this configuration, media data elements are shuffled before being packed into RTP packets, and "de-shuffled" (i.e., reordered into their original order) after being extracted from RTP packets. This configuration makes the shuffling and de-shuffling processes effectively invisible to the RTP/RTCP functions, so that these functions need not be specially modified. However, embodiments according to this approach will generally require an additional buffer between the RTP function and the multimedia source for holding the media data elements during the shuffling process. Of course, if this alternative configuration of media server 110 is used, then corresponding changes to the client device 150 are also required.

The header of RTP packets includes a packet sequence number. In some embodiments of the present invention, this sequence number is not involved in the reordering process. Instead, an independent transmission sequence number is created and added to the payload of the RTP packet. (The details of this transmission sequence number, and its use, are provided below.) Those skilled in the art will appreciate that this approach avoids the creation of a dependency between the shuffling processing and the RTP protocol. This approach thus facilitates the use of network topologies like that pictured in FIG. 2, where media server 110 transmits the shuffled RTP packets to relay device 210, which may store the stream temporarily before resending the stream to client device 150. Because the shuffling process does not depend on the conventional RTP sequence numbers, the relay device 210 need not even be aware of the shuffling process, and may alter or replace the RTP sequence numbers without any consequence to the reordering at the client device 150. Thus, streams shuffled according to the techniques herein may be relayed through "untrusted" intermediaries.

Figure 2:
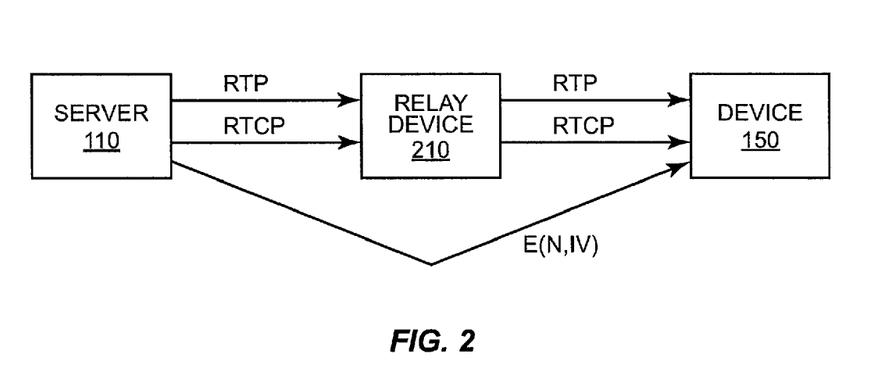
FIG. 2 is a block diagram of an alternative multimedia streaming system according to some embodiments of the present invention.

Whether or not the media stream passes through an intermediary, information that needs to be securely communicated from the media server 110 to the client device 150 may be sent outside of the RTP/RTCP standard. As will be explained in more detail below, this information includes two confidential parameters: a group size and an initialization value. In some embodiments, these parameters are encrypted by the media server 110 and transmitted to the client device 150, where they are decrypted. In some embodiments, this information may be managed using an existing digital rights management (DRM) "eco system", while in other embodiments new protocols and/or management systems may be developed for communicating and managing this confidential information. As will be discussed in further detail below, these confidential parameters may remain constant for the entire duration of one or more media streams, or may be changed at more frequent intervals to further enhance the security of the streaming system.

Figure 3A:
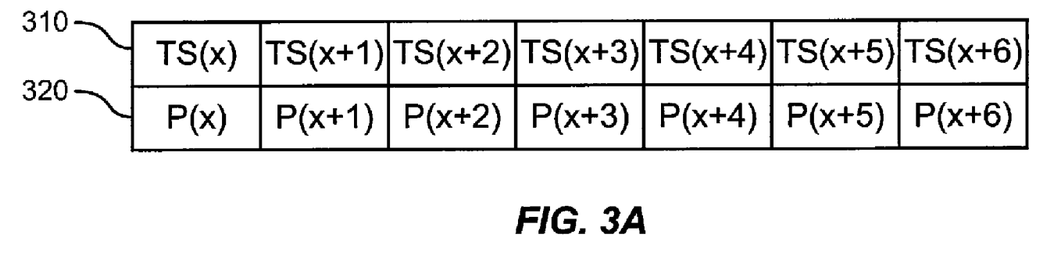
FIGS. 3A and 3B illustrate the input and output, respectively, of an exemplary shuffler according to some embodiments of the present invention.
Figure 3B:
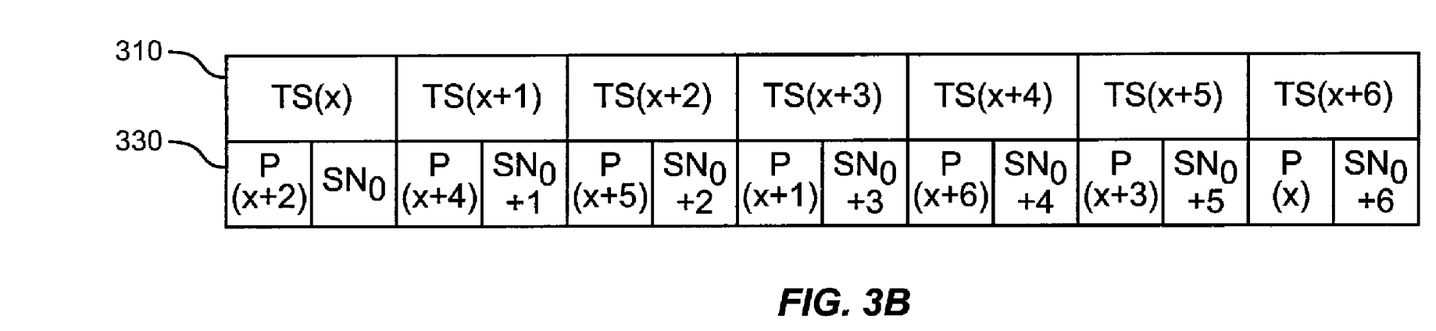

FIG. 3 illustrates an exemplary reshuffling of RTP packet payloads according to some embodiments of the invention. In FIG. 3A, several consecutive media data elements 320 from a multimedia source are pictured, along with corresponding time stamps 310, in the correct order for rendering (from left to right). In conventional RTP packets, the time stamps 310 are carried in the packet headers, while the media data elements 320 are carried in the RTP payloads. In FIG. 3A, seven pairs of time stamps 310 and media data elements 320 are pictured, and indexed from x to x+6. Accordingly, the group size in this example is N=7. However, other group sizes are possible, as discussed further below, and larger group sizes will frequently be used.

In FIG. 3B, the media data elements 320 have been shuffled, and appear in modified payloads 330. Each modified payload comprises one of the original media data elements P(i), but in an apparently random (i.e., pseudorandom) order, along with a new transmission sequence number SN(j). Although the media data elements P(i) are pseudo-randomly ordered, the corresponding transmission sequence numbers SN(j) increase by one for each packet from left to right. It can also be seen that the timestamps 310 are not reordered.

Because the shuffled media data elements are no longer paired with their original timestamps, an attacker without knowledge of how the payloads are reordered must try to find the correct ordering by brute force. Of course, the complexity of this attack increases by the factorial of the group size N. Even if the attack is fully automated (i.e., involving no manual evaluation of partial results), relatively small group sizes of eight to ten, yielding factorial values of 40,320-3,628,800, make this type of attack very costly. Furthermore, the group size is generally unknown to an attacker, which makes the attack even more costly, since reordering must be attempted using various possible group sizes. Finally, it is not clear whether an effective fully automatic attack can be designed, as it will be necessary for each candidate reordering to be tested to determine whether it represents a correct ordering; this evaluation is likely to require complex audio and/or video processing, further increasing the complexity of an attack.

Figure 4:
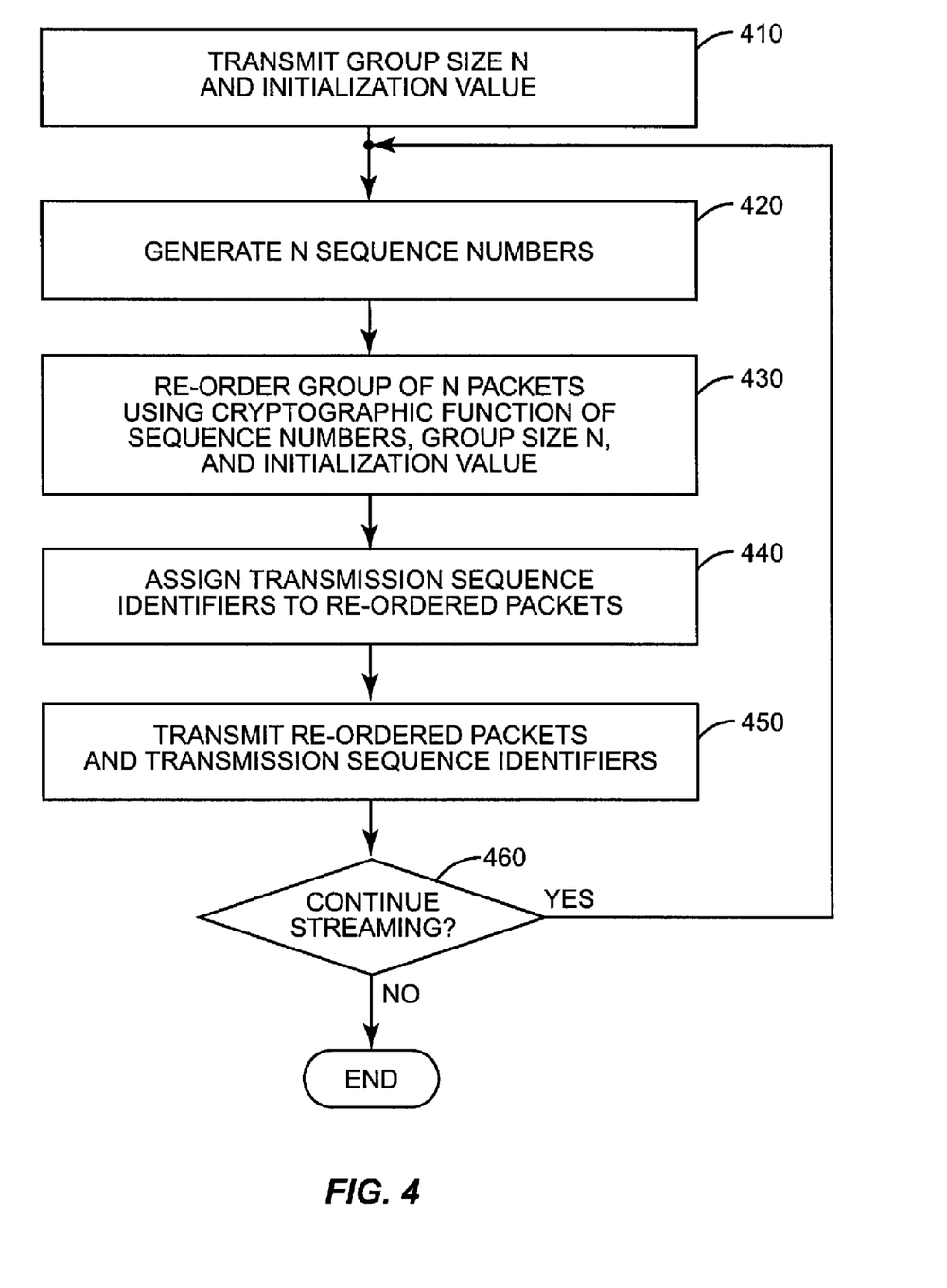
FIG. 4 is a process flow diagram illustrating an exemplary method for transmitting multimedia data.
Figure 5:
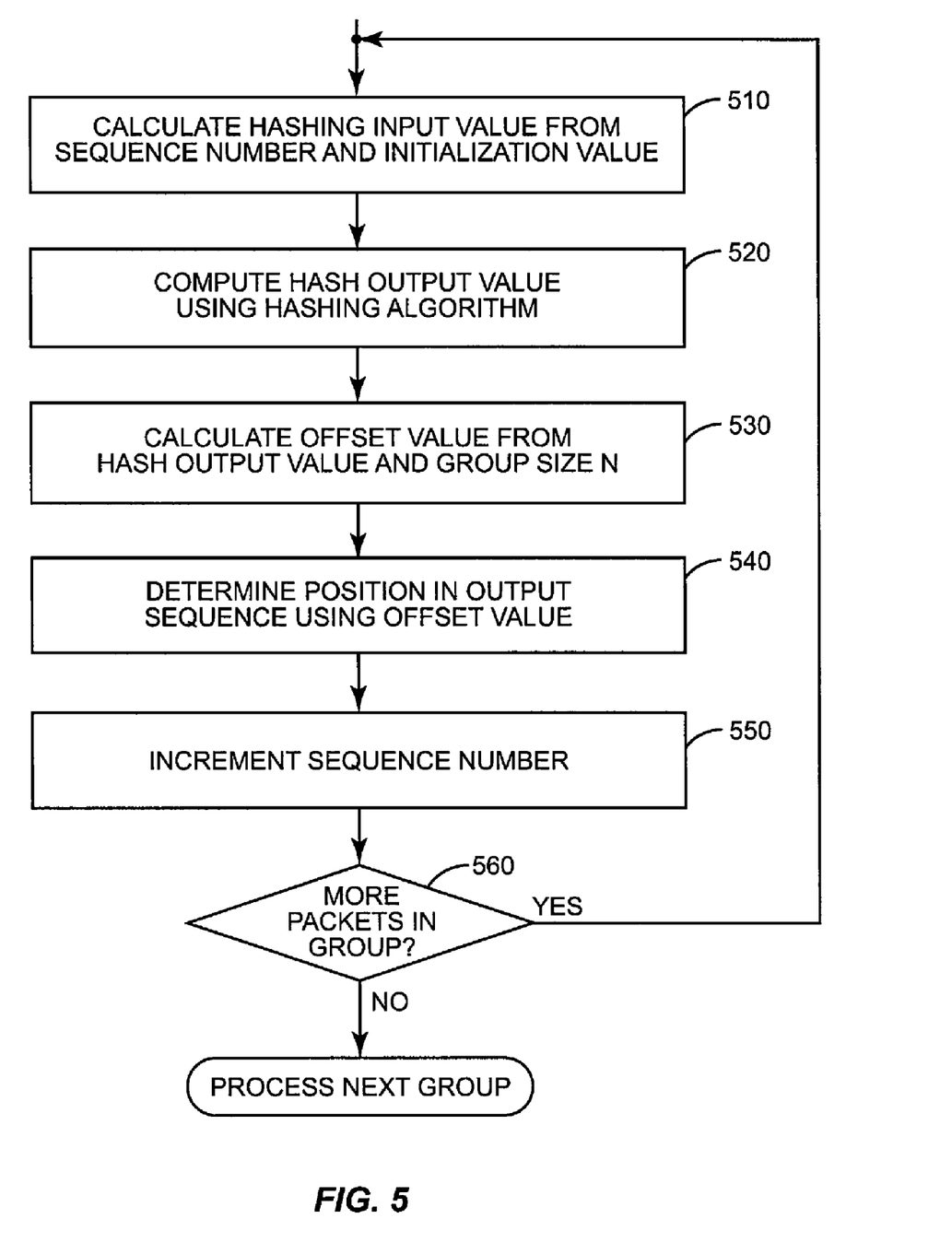
FIG. 5 is a process flow diagram illustrating details of one exemplary method for re-ordering multimedia elements for transmission using a cryptographic hashing function.
Figure 6:
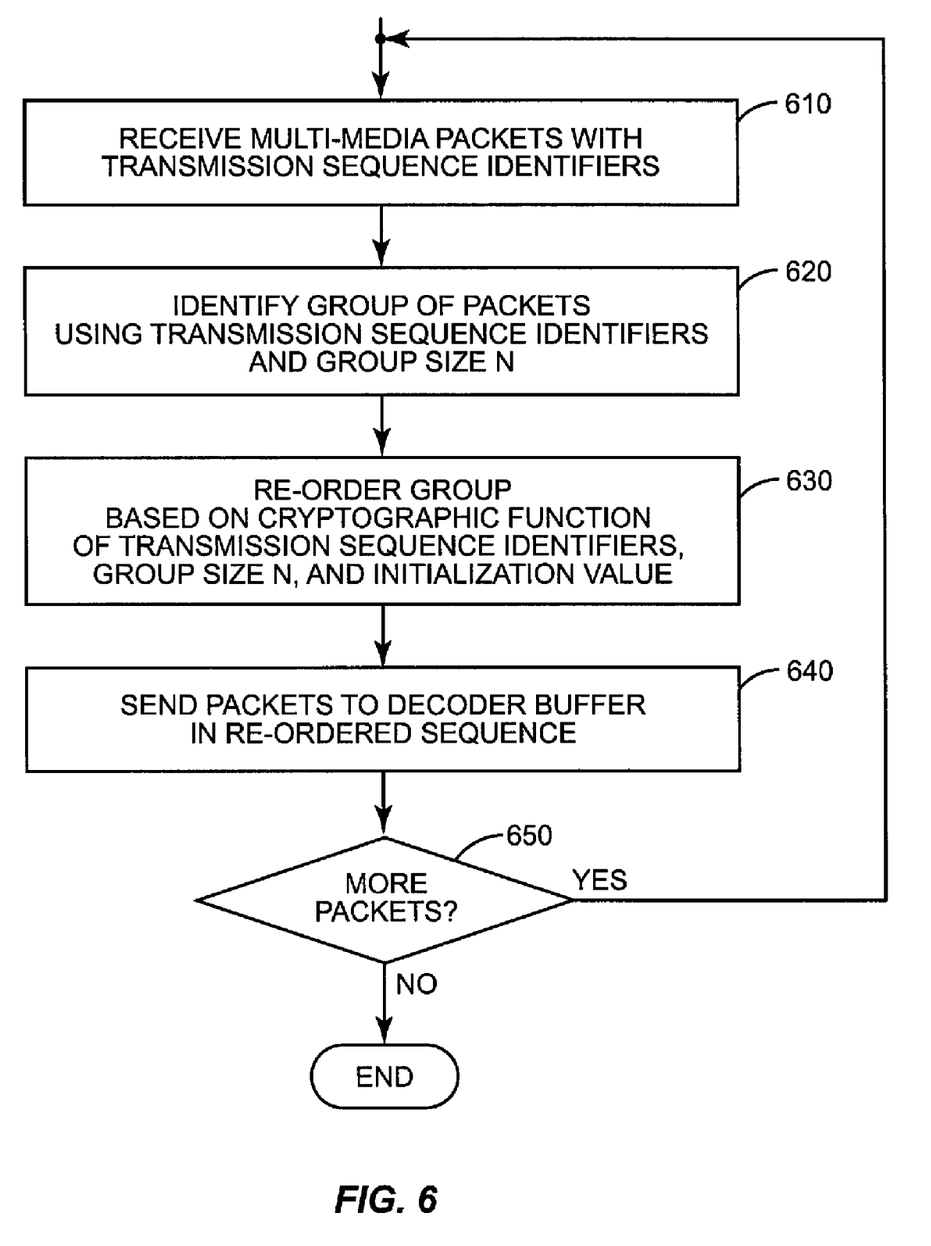
FIG. 6 is a process flow diagram illustrating a method for de-shuffling received multimedia data elements, according to some embodiments of the present invention.
Figure 7:
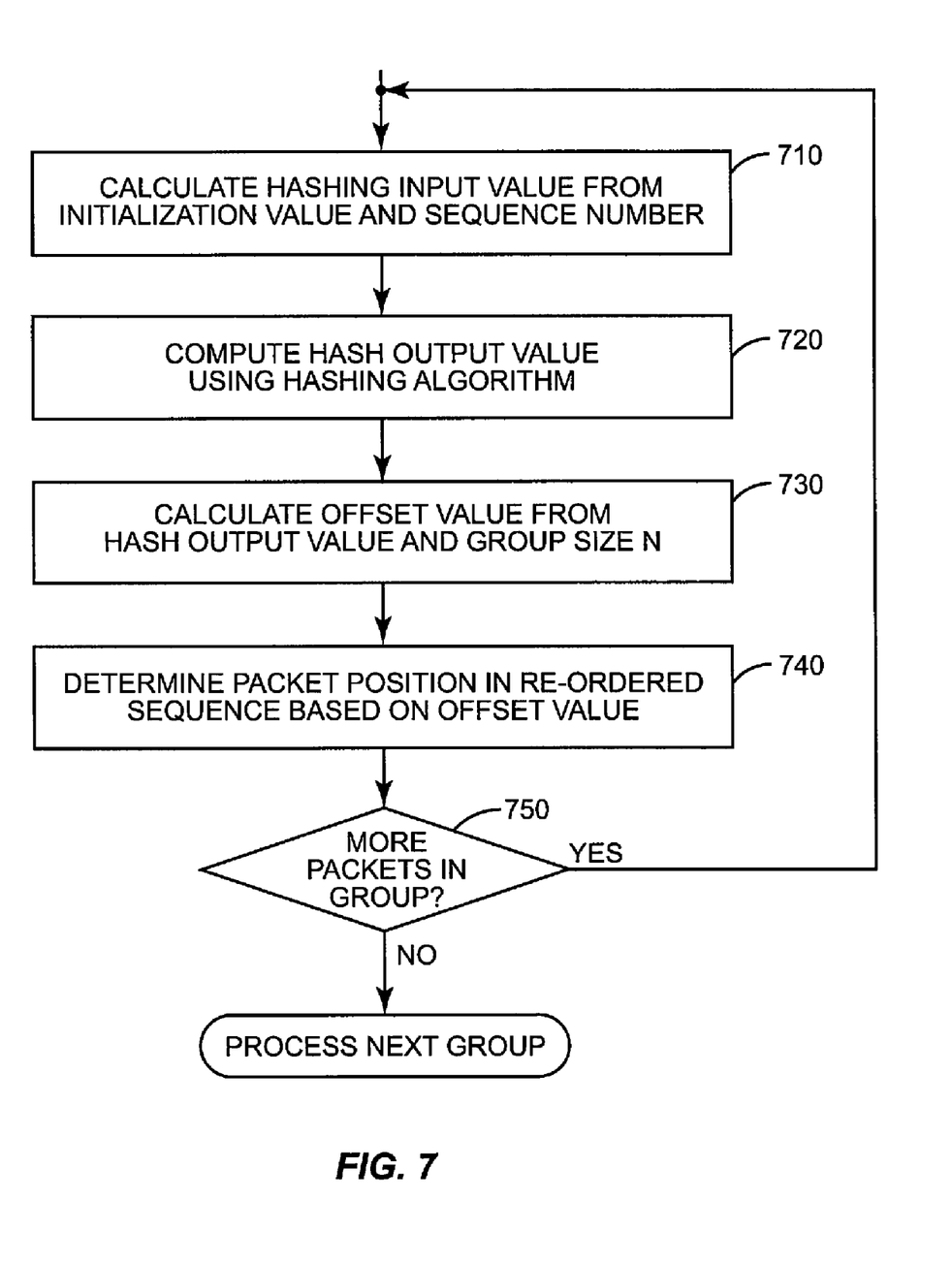
FIG. 7 is a process flow diagram illustrating details of one exemplary method for de-shuffling multimedia elements, using a cryptographic hashing function.

FIGS. 4 and 5 are process flow diagrams illustrating exemplary methods for transmitting multimedia data, according to some embodiments of the invention, while FIGS. 6 and 7 illustrate corresponding processes for processing received data. As will be seen, the processes illustrated in these figures are based on a cryptographic hashing function that depends on a series of transmission sequence numbers, a group size N, and an initialization value $V_I$. However, other implementations, using other shuffling functions that depend on these variables, are also possible. For instance, other so-called one-way functions or trapdoor one-way functions might be used. (The term "one-way function" is used here in its weak sense, i.e., a function that is computationally difficult to invert, but not necessarily proven to be hard to invert in the strict mathematical sense. Those skilled in the art will thus appreciate that one-way functions used in embodiments of the present invention might include, but are not limited to, functions based on integer factorization, the Rabin function, discrete logarithms, or various NP-complete problems.)

The processes illustrated in FIGS. 4-7 use two parameters that should be handled confidentially. In other words, these parameters should be confidentially communicated from the multimedia server to the media client device and then securely handled during their lifetimes by both nodes. These two parameters are an initialization value $V_I$, and a group size N, which are transmitted to the client device by the media server, as shown at block 410 of FIG. 4. In some embodiments, the initialization value $V_I$ may be a randomly selected 128-bit value, which is convenient for use with the well-known MD5 hashing algorithm, although other lengths may be used, e.g., to match other algorithms. The length of the parameter used to transmit the group size N should be large enough to accommodate the largest anticipated group size; a 16-bit value may be suitable in many applications. As suggested above, these parameters may be encrypted according to conventional means before they are transmitted, and decrypted by the receiving client device before use.

Once the group size N has been established, the shuffling unit processes consecutive media data elements in groups of size N. Accordingly, the shuffling unit receives media data from the multimedia source for a first group of N packets. The multimedia source (and any processing functions preceding the shuffler) need not be aware of the group size, as the shuffling unit can simply buffer data until the required number is collected. Given the media server configuration of FIG. 1, these media data elements are already packaged into RTP packets, although, as noted above, alternative configurations may shuffle media data elements before the RTP packets are formed.

As shown at block 420, the shuffling unit generates N sequence numbers for a first group of media data elements. These sequence numbers initially correspond to the unshuffled media data elements in order. However, as will be seen, transmission sequence identifiers corresponding to these sequence numbers are ultimately concatenated with the shuffled payloads for this first group. These sequence numbers are conveniently consecutive, although other pre-determined sequences may be used. As will be discussed in more detail later, 16 bits is a convenient length for these sequence numbers, although other pre-determined lengths may be used.

The shuffling unit then reorders the first group of N media data elements from their original real-time sequence into an output sequence according to a shuffling function that depends on the sequence numbers, the pre-determined group size N, and the pre-determined initialization value $V_I$. In particular, the shuffling process illustrated at block 430 of FIG. 4 is based on a cryptographic hashing function that depends on these three variables, although other shuffling functions are possible.

After all of the payloads in the first group are re-ordered, a transmission sequence identifier is assigned to each of the re-ordered media data elements, as shown at block 440. These transmission sequence identifiers are conveniently identical to the sequence numbers generated at block 420 and used in the shuffling algorithm, but in some embodiments may differ from those sequence numbers according to a pre-determined rule or mathematical operation. In either event, the transmission sequence identifiers are packaged into RTP packets, along with the corresponding re-ordered media data elements, and transmitted to the media client (or other device), as shown at 450. The entire shuffling process is then repeated, as indicated at block 460, if any media data elements remain to be processed. Those skilled in the art will appreciate that the same group size N and initialization value $V_I$ may be used for all subsequent groups of the media stream, and even for several simultaneous or consecutive streams in a given multimedia session, but one or both may be periodically changed, as well, to further enhance the security of the scrambling.

Details of an exemplary shuffling function are illustrated in the process flow diagram of FIG. 5, which illustrates the processing of a single group of N consecutive media data elements. In this exemplary process, a hashing input value is calculated from the initialization value $V_I$ and the sequence number that corresponds to the first media data element of the group, as shown at block 510. In particular, the sequence number is concatenated with itself until the result reaches the same bit size used for the initialization value $V_I$ (e.g., 128 bits). For example, eight instances of a 16-bit sequence number may be concatenated to obtain a 128-bit value. The concatenated value is then combined with the initialization value $V_I$, using an exclusive-OR (XOR) operation, to obtain the hashing input value.

As shown at block 520, the result of this operation is used as the input to a conventional cryptographic hashing algorithm. In some embodiments, the hash algorithm is the well-known MD5 algorithm, which requires 512-bit inputs, in which case the XOR-ed value may be concatenated with itself several times to obtain a 512-bit input value. (Those skilled in the art will immediately appreciate that the XOR-ed value may be easily adapted to other input sizes and/or cryptographic functions.) An offset value is then calculated by using the output from the hash algorithm as the dividend to a modulo-function, using N as the divisor. In other words, if X is the output of the cryptographic hashing algorithm, then:

$$Y = X \bmod N, \qquad (1)$$

where the remainder Y provides an offset to the shuffled position for the media data element from the original sequence that corresponds to the sequence number used in the previous calculation. Accordingly, the position in the shuffled output sequence of the first media data element is determined from the calculated offset value, as shown at block 540.

The use of this offset Y to determine the position of the first media data element is best understood with reference to the example illustrated in FIG. 3. The first media data element in the original sequence is P(x), corresponding to timestamp TS(x). Initially, P(x) corresponds to the first transmission sequence number in the sequence $SN_0$. However, when $SN_0$, the group size of 7, and an initialization value $V_I$ are used in the function described above, the result is an output offset Y=6. Thus, the media data element P(x) is shifted by six places, into the payload corresponding to the timestamp TS(x+6).

The calculation described above is repeated for the next sequence number value ($SN_0+1$), to obtain the position for P(x+1), and so on, for each payload in the group. Accordingly, the sequence number is incremented, as shown at block 550, and the process repeated until there are no more packets in the group, as indicated at block 560. Those skilled in the art will appreciate that the offset calculated with the above calculation will occasionally be the same as for an earlier calculation for this group. To address this, a rule may be implemented indicating that when this occurs, the payload should be placed in the next free position, e.g., at the next higher index value. If such a collision occurs for the rightmost entry in the group, the payload may be placed in the first available packet from the beginning. Of course, other rules for dealing with such collisions may be used, provided that these rules are deterministic and known to the client device that will be receiving and processing the shuffled packets.

Once the above process has been repeated for all payloads in the group, the resulting shuffling order cannot easily be reversed or recalculated without access to the initialization value and group size, even if the remaining details of the shuffling function are known. When the RTP packets containing the shuffled payloads have arrived at the client device, a de-shuffling operation is executed to restore the original, real-time sequence for the payloads. Because the client device has been provided with the group size N and the initialization value $V_I$, this de-shuffling process is quite similar to the shuffling process, as will be later described. An exemplary receiving and de-shuffling process corresponding to the process of FIGS. 4 and 5 is illustrated in the process flow diagrams of FIGS. 6 and 7.

The general process is illustrated at FIG. 6, and begins, as shown at block 610, with the reception of several multi-media packets that include media data element payloads, as well as transmission sequence identifiers. These transmission sequence identifiers reflect the shuffled order for the media data elements, rather than the original real-time sequence. The de-shuffling function of the receiving client device must first identify which received packets belong to a given group, as shown at block 620. Assuming that the transmission sequence identifiers are the same as the sequence numbers used in the process of FIGS. 4 and 5, then the members of each group can be identified as a simple function of the transmission sequence identifiers and the pre-determined group size N. In particular, given the shuffling procedure of FIG. 5, the de-shuffler may divide each transmission sequence identifier by the group size N, using integer and modulo division. As a result, an integer quotient and a remainder will be calculated for each transmission sequence identifier. All packets for which the integer quotient is the same belong to the same group. Since the receiving device knows the group size, it can easily determine when all packets for a group are received. However, to account for packet loss, the de-shuffler may be configured to proceed with an incomplete group after waiting a pre-configured time for a missing packet.

Once a group is assembled, a de-shuffling process corresponding to the shuffling process at the media server is used to re-order the payloads for the group of received packets into their original real-time sequence, as shown at block 630. Like the shuffling process, the de-shuffling process is based on a de-shuffling function that depends on the transmission sequence identifiers, the group size, and the initialization value. Once the payloads are re-ordered into their original sequence, the media data elements may be sent to a decoder buffer, in the original real-time sequence, for rendering by an appropriate playback device and/or media player software, as shown at block 640. The process is repeated, as indicated at block 650, until there are no more received packets to process.

FIG. 7 illustrates the details of an exemplary de-shuffling process, based on the use of a cryptographic hashing function, corresponding to the shuffling process of FIG. 5. This process begins after a group of packets have been identified as belonging to a single group.

As noted above, a remainder may be calculated for each transmission sequence identifier using modulo division, e.g.:

$$R_i = SN_i \bmod N, \qquad (2)$$

where $SN_i$ is the transmission sequence identifier corresponding to received packet i. The transmission sequence identifier $SN_i$ that corresponds to a remainder of zero is first identified. This transmission sequence identifier is used as an input to the same algorithmic calculation used in the media server's shuffler, along with the pre-determined group size and initialization value. In particular, given the shuffling function described above, the transmission sequence identifier is first used to obtain a hashing input value, as shown at block 710. The transmission sequence identifier is thus concatenated with itself, until a number having the same binary length as the initialization value (e.g., 128 bits) is obtained, and then exclusive-OR'ed with the initialization value. The result of this operation is then concatenated with itself to obtain the hash input value.

Next, a hash output value is calculated, as shown at block 720 using the same cryptographic hashing algorithm used in the shuffler. As noted above, the cryptographic hashing algorithm in some embodiments may be the well-known MD5 algorithm, although other algorithms might be used instead, in other embodiments. The hash output value is then used to calculate an offset value, as shown at block 730, again using the corresponding calculation used by the shuffler, e.g.:

$$Y' = X' \bmod N, \qquad (3)$$

where X' is the hash output value and Y' is the resulting offset value. The output of this calculation points out the position in the shuffled group that contains the payload that corresponds to the timestamp for the first packet in the shuffled sequence. This payload is then determined, using the offset value, as shown at block 740, and reordered to the first position of the group. The corresponding transmission sequence identifier, which was added during the shuffling process, is no longer needed, and may be removed from the first packet at this point in the process.

This process is repeated for each of the packets in the group, as indicated at block 750. Thus, the transmission sequence identifier corresponding to a remainder of one is used as input to get the offset for the payload that is reordered to the second position, and so on. If the offset calculation indicates an "empty" position (i.e., a payload that has already been re-ordered), then the payload of the next filled position is chosen instead, following a rule that effectively reverses the rule implemented on the media server side. When all the payloads of a particular group are re-ordered then the de-shuffling is finished, and the group of packets can be delivered to the multimedia player or other application in the client device.

Those skilled in the art will appreciate that packet loss in the transmission between media server and client device can be readily accommodated by the above-described de-shuffling process algorithm, since the fact that a packet is missing will be explicitly visible in the chain of transmission sequence numbers. (The transmission sequence numbers will suddenly jump two steps instead of one, for a single missing packet.) Since the de-shuffler goes through the steps in the same order as the shuffler, it will be possible to reorder the remaining payloads. Generally, a reordered payload very likely will be placed in the position of the missing packet, but this payload will not have an associated time stamp (since the timestamp would have been included in header data for the missing packet). One solution to this problem is that a new time stamp can be calculated by using the time stamp information from its two neighbor packets (e.g., by interpolation). Any packets (or timestamps) that are left without a media data element after the de-shuffling process may simply be discarded before the re-ordered media data elements are delivered to the above protocol layers and/or the multimedia rendering unit.

In a variation to the techniques described above, the number of hash calculations performed during the shuffling and de-shuffling operations can be reduced by using the output of a single hash calculation as the input to several position offset calculations. For example, if the group size is selected to a value less than 256, then the output from the hash calculation may be separated into individual bytes or groups of two or more bytes, with each byte or group of bytes serving as the dividend for a separate modulo division calculation. Each separate modulo division calculation yields an offset for a corresponding media data element. For example, the least significant byte could be used as the dividend for a modulo-N calculation for the first media data element in the real-time sequence, with the next significant byte used in the same calculation for the second media data element and so on. If the output of one hash calculation does not yield enough bytes or groups of bytes to reorder the entire group, then a new hash calculation from the next sequence number may be performed and used as input for ordering the next "sub-group" of media data elements. Of course, those skilled in the art will appreciate that many similar variations of this complexity-reducing approach are possible, provided only that the server and client device(s) apply the same techniques to a given stream. In various implementations, a specific variation can be fixed, or a particular variation may be selected for each session, and information identifying that variation transmitted by the multimedia server and transmitted to all involved clients. The selection of a particular variation may be performed by the server, in some embodiments, or may be agreed upon in a negotiation between the server and one or more client devices.

In the techniques described above, the transmission sequence number is the key to determining which packets belong to the same group. Those skilled in the art will appreciate that because the size chosen to represent the sequence number is limited, the sequence number will eventually "wrap." In other words, incrementing the transmission sequence number will eventually result in the transmission sequence number starting to count up from zero again. To ensure that packets are properly grouped at the client device, this "wrapping" should not be allowed to happen "inside" a group. Thus, the shuffler in some embodiments of the present invention is configured to check whether this will happen, before processing a given group. If the check indicates that this would otherwise happen, the shuffler instead re-starts the current group from the sequence number zero (or some other arbitrary multiple of the group size). If this is not done, following groups will no longer start on the remainder zero from the modulo-N calculation, and hence it will be necessary to keep track of, and distribute, this state information.

However, the fact that the sequence number wraps in this manner could be used in an attack to find out the group size used, by finding the common divisors of the maximum sequence number used before wrapping. The group size is necessarily one of the found common divisors. Although a discovered or revealed group size is not alone enough to de-shuffle the re-ordered packets, knowledge of it would nonetheless make attacks somewhat easier. As a result, it is preferable, although not required, that the sequence number should not wrap too often, or at too small a number. In some embodiments, then, the size of the sequence number may be chosen so that "wrapping" is unlikely, or uncommon. Thus, for example, some embodiments might use 16 bits to represent the sequence number, in which case the sequence numbers will wrap at numbers close to 65535. Given a 50-Hz RTP packet rate, it would take about 21 minutes before the first wrap would occur (65535*0.02 sec). Some applications might use a longer transmission sequence number, to further reduce the frequency of wrapping.

As discussed above, some embodiments of the present invention use RTP packets for transmitting the shuffled multimedia data elements. In some of these embodiments, the payload of a shuffled packet is the original payload (i.e., the multimedia data element) concatenated with the transmission sequence identifier. In some embodiments, the transmission sequence identifier may be appended in front of the original payload, to simplify finding the transmission sequence identifier. In either case, the modified payload should be identifiable by a compatible de-shuffler. In some embodiments this may be done by defining a new RTP profile, according to the existing specifications for the RTP protocol. Of course, those skilled in the art will appreciate that the shuffling and de-shuffling techniques described herein may be used with packet transmission protocols other than RTP, including proprietary (i.e., non-standard) protocols.

With these and other variations and extensions in mind, those skilled in the art will appreciate that the preceding detailed descriptions of various embodiments of methods for transmitting shuffled multimedia data and for receiving and processing shuffled multimedia data are given for purposes of illustration and example; the applicability of the inventive techniques disclosed herein are not limited to the precise details of these illustrative examples. Those skilled in the art will further appreciate that these techniques may be implemented with and using a variety of networked communication devices, whether configured for wireless or wired networking.

Figure 8:
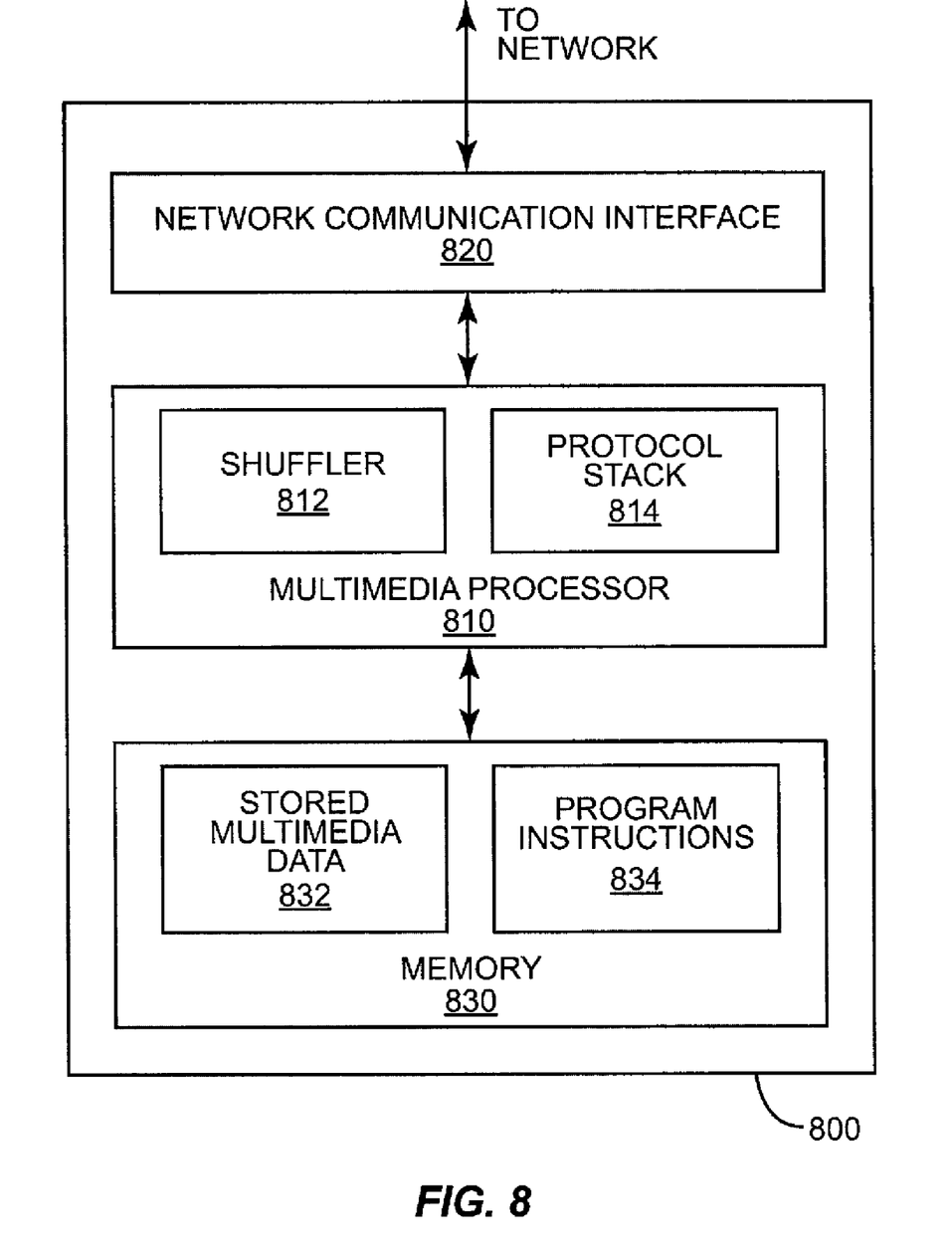
FIG. 8 is a functional block diagram of an exemplary streaming multimedia server.

FIG. 8 illustrates one such exemplary streaming multimedia server device 800, which may be configured to carry out one or more of the techniques described above. Server device 800 includes a multimedia processor 810, a network communication interface 820, and memory 830. Multimedia processor 810 is configured to include a shuffler function 812 and a protocol stack function 814; these functions may be configured using program instructions 834 stored in memory 830. Shuffler function 812 and protocol stack 814 have access to one or more multimedia sources stored in memory 830 in the form of stored multimedia data 832; in some embodiments multimedia processor 810 may further have access to multimedia sources supplied from an external device, such as via network communication interface 820.

Multimedia processor 810 may thus be configured to carry out one or more of the techniques discussed above for shuffling and transmitting multimedia data, including the techniques illustrated in FIGS. 4 and 5. In some embodiments, multimedia processor 810 may comprise one or more microprocessors, microcontrollers, and/or digital signal processors programmed with appropriate software and/or firmware to carry out one or more of the processes described above, or variants thereof. In some embodiments, these processing circuits may comprise customized hardware to carry out one or more of the functions described above, such as one or more cryptographic calculations.

Figure 9:
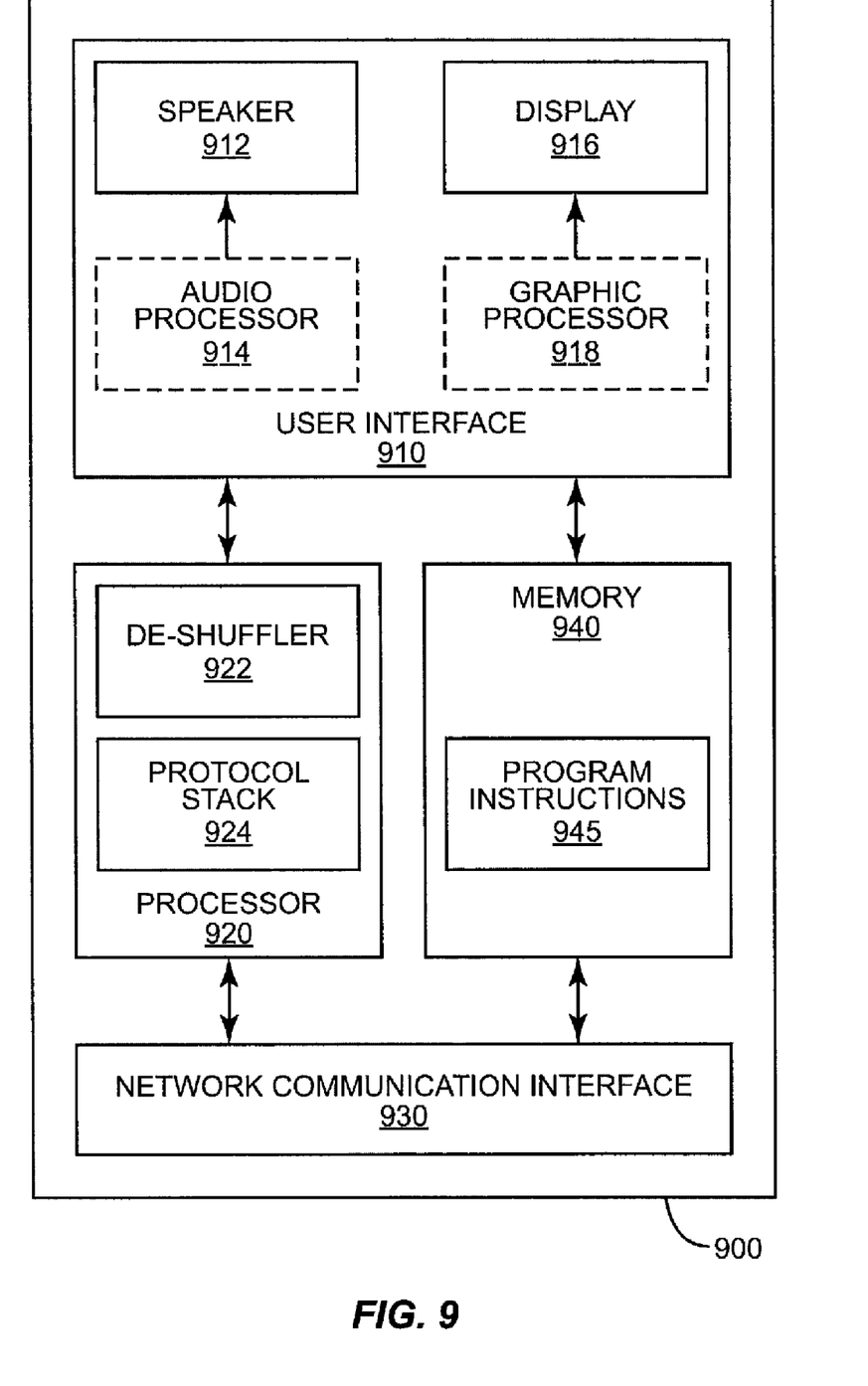
FIG. 9 is a functional block diagram of an exemplary communication device for receiving streaming multimedia data according to some embodiments of the present invention.

In a similar fashion, FIG. 9 illustrates an exemplary streaming multimedia client device 900, which may also be configured to carry out one or more of the techniques described above. Client device 900 includes a user interface 910, a processor 920, a network communication interface 930, and memory 940. Processor 920 is configured to include a de-shuffler function 922 and a protocol stack function 924; these functions correspond directly to the shuffler 812 and protocol stack 814 of FIG. 8, and may be configured using program instructions 945 stored in memory 940. De-shuffler function 922 and protocol stack 924 process multimedia packets received via network communication interface 930, according to one or more of the techniques described above. De-shuffled media data elements are supplied to user interface 910, for rendering by a suitable output device such as speaker 912 or display 916. User interface 910 may also include audio processor 914 and/or graphics processor 918, for performing such functions as decoding encoded audio or video data, converting digital data into analog form, and the like. As with multimedia processor 810, processor 920 may in various embodiments comprise one or more microprocessors, microcontrollers, and/or digital signal processors programmed with appropriate software and/or firmware to carry out one or more of the processes described above, or variants thereof. In some embodiments, these processing circuits may comprise customized hardware to carry out one or more of the functions described above, such as one or more cryptographic calculations.

In some embodiments, client device 900 may comprise a wireless receiver device, such as a cell-phone, wireless-enabled personal digital assistant, or the like, comprising one or more appropriately configured processing circuits and network interface hardware and software configured for compatibility with one or more wireless networking standards. In some embodiments, the de-shuffler 922 and protocol stack 924 may be embodied in one or more application-specific integrated circuits (ASICs).

Those skilled in the art will recognize, of course, that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method in a first communication device for transmitting multimedia data, the method comprising, for a first group of media data elements in a real-time sequence and having a pre-determined group size N:
    generating a first series of N sequential sequence numbers;
    re-ordering the first group of media data elements from the real-time sequence into a first output sequence according to a shuffling function that depends on the sequence numbers, the pre-determined group size N, and a pre-determined initialization value;
    assigning transmission sequence identifiers that correspond to the sequential sequence numbers to the re-ordered media data elements, according to the first output sequence; and
    transmitting the re-ordered media data elements and the corresponding transmission sequence identifiers to a second communication device.

2. The method of claim 1, wherein the shuffling function comprises a one-way function of the sequence numbers, the pre-determined group size N, and the pre-determined initialization value.

3. The method of claim 1, wherein re-ordering the first group of media data elements comprises, for a first one of the media data elements:
    calculating a hashing input value as a function of a first one of the sequence numbers and the pre-determined initialization value;
    computing a hash output value from the hashing input value, using a cryptographic hashing algorithm;
    calculating an offset value based on the hash output value and the pre-determined group size N; and
    determining a position in the output sequence for the first one of the media data elements based on the offset value.

4. The method of claim 3, wherein calculating the hashing input value comprises combining the first one of the sequence numbers and the pre-determined initialization value with an exclusive-OR operation to obtain the hashing input value.

5. The method of claim 3, wherein calculating the offset value comprises computing the modulo of the hash output value, using the group size N as the divisor.

6. The method of claim 3, wherein determining a position in the output sequence for the first one of the media data elements based on the offset value comprises:
    adding the offset value to the first one of the sequence numbers to obtain a second sequence number; and
    allocating to the first one of the media data elements a first position in the output sequence that corresponds to the second sequence number, if the first position has not already been allocated, otherwise allocating a next available position.

7. The method of claim 1, further comprising, for a second group of N media data elements immediately succeeding the first group of media data elements in the real-time sequence:
    generating a second series of N sequential sequence numbers;

re-ordering the second group of media data elements into a second output sequence according to a shuffling function that depends on the second series of sequence numbers, the pre-determined group size N, and the pre-determined initialization value;

assigning transmission sequence identifiers that correspond to the second series of sequential sequence numbers to the re-ordered media data elements of the second group, according to the second output sequence; and transmitting the re-ordered media data elements of the second group and the corresponding transmission sequence identifiers to the second communication network device.

8. The method of claim 7, wherein generating the second series of N sequential sequence numbers comprises generating sequential numbers immediately succeeding the first series of sequential sequence numbers if none of the resulting sequential numbers exceeds a predetermined maximum sequence number, and otherwise generating sequential numbers beginning at a predetermined initial sequence number.

9. The method of claim 1, further comprising transmitting, to the second communication device, encrypted data identifying the pre-determined group size N and the pre-determined initialization value.

10. A streaming multimedia server device, comprising a multimedia shuffling processor and a network communication interface configured to transmit shuffled multimedia data to at least one remote communications device, wherein the multimedia shuffling processor is configured to:

generate a first series of N sequential sequence numbers, wherein N is a pre-determined group size;

re-order a first group of N media data elements from a real-time sequence into a first output sequence according to a shuffling function that depends on the sequence numbers, the pre-determined group size N, and a pre-determined initialization value;

assign transmission sequence identifiers that correspond to the sequential sequence numbers to the re-ordered media data elements, according to the first output sequence; and transmit the re-ordered media data elements and the corresponding transmission sequence identifiers to a second communication device, using the network communication interface.

11. The streaming multimedia server device of claim 10, wherein the shuffling function comprises a one-way function of the sequence numbers, the pre-determined group size N, and the pre-determined initialization value.

12. The streaming multimedia server device of claim 10, wherein the multimedia shuffling processor is configured to re-order a first one of the media data elements by:

calculating a hashing input value as a function of a first one of the sequence numbers and the pre-determined initialization value;

computing a hash output value from the hashing input value, using a cryptographic hashing algorithm;

calculating an offset value based on the hash output value and the pre-determined group size N; and determining a position in the output sequence for the first one of the media data elements based on the offset value.

13. The streaming multimedia server device of claim 12, wherein the multimedia shuffling processor is configured to calculate the hashing input value by combining the first one of the sequence numbers and the pre-determined initialization value with an exclusive-OR operation to obtain the hashing input value.

14. The streaming multimedia server device of claim 12, wherein the multimedia shuffling processor is configured to calculate the offset value by computing the modulo of the hash output value, using the group size N as the divisor.

15. The streaming multimedia server device of claim 12, wherein the multimedia shuffling processor is configured to determine a position in the output sequence for the first one of the media data elements based on the offset value by:

adding the offset value to the first one of the sequence numbers to obtain a second sequence number; and allocating to the first one of the media data elements a first position in the output sequence that corresponds to the second sequence number, if the first position has not already been allocated, otherwise allocating a next available position.

16. The streaming multimedia server device of claim 10, wherein the multimedia shuffling processor is further configured to:

generate a second series of N sequential sequence numbers;

re-order a second group of N media data elements immediately succeeding the first group of media data elements in the real-time sequence into a second output sequence according to a shuffling function that depends on the second series of sequence numbers, the pre-determined group size N, and the pre-determined initialization value;

assign transmission sequence identifiers that correspond to the second series of sequential sequence numbers to the re-ordered media data elements of the second group, according to the second output sequence; and transmit the re-ordered media data elements of the second group and the corresponding transmission sequence identifiers to the second communication network device, using the network communication interface.

17. The streaming multimedia server device of claim 16, wherein the multimedia shuffling processor is configured to generate the second series of N sequential sequence numbers by generating sequential numbers immediately succeeding the first series of sequential sequence numbers if none of the resulting sequential numbers exceeds a predetermined maximum sequence number, and to otherwise generate sequential numbers beginning at a predetermined initial sequence number.

18. The streaming multimedia server device of claim 10, wherein the multimedia shuffling processor is further configured to transmit encrypted data to the second communication device, using the network communication interface, wherein the encrypted data identifies the pre-determined group size N and the pre-determined initialization value.

19. A method in a first communication device for processing multimedia data, the method comprising:

receiving a series of media data elements from a second communication device, each media data element having a corresponding transmission sequence identifier;

identifying a first group of the media data elements, using the transmission sequence identifiers and a pre-determined group size;

re-ordering the first group of media data elements from a first sequence corresponding to the transmission sequence identifiers to a re-ordered sequence, according to a de-shuffling function that depends on the transmission sequence identifiers, the pre-determined group size, and a pre-determined initialization value; and rendering the media data elements in the re-ordered sequence.

20. The method of claim 19, wherein the de-shuffling function comprises a one-way function of the sequence numbers, the pre-determined group size N, and the pre-determined initialization value.

21. The method of claim 19, wherein identifying a first group of the media data elements comprises identifying media data elements for which dividing sequence numbers corresponding to the transmission sequence identifiers by the pre-determined group size yields a quotient having an integer portion equal to a pre-determined group number.

22. The method of claim 19, wherein re-ordering the first group of media data elements comprises, for a first one of the media data elements:
    calculating a hashing input value as a function of the pre-determined initialization value and a sequence number corresponding to the transmission sequence identifier for the first one of the media data elements;
    computing a hash output value from the hashing input value, using a cryptographic hashing algorithm;
    calculating an offset value based on the hash output value and the pre-determined group size N; and
    determining a position in the re-ordered sequence for the first one of the media data elements based on the offset value.

23. The method of claim 22, wherein calculating the hashing input value comprises combining the pre-determined initialization value and the sequence number corresponding to the transmission sequence identifier for the first one of the media data elements, using an exclusive-OR operation, to obtain the hashing input value.

24. The method of claim 22, wherein calculating the offset value comprises computing the modulo of the hash output value, using the pre-determined group size as the divisor.

25. The method of claim 22, wherein determining a position in the re-ordered sequence for the first one of the media data elements based on the offset value comprises:
    adding the offset value to the sequence number for the first one of the media data elements to obtain a second sequence number; and
    allocating to the first one of the media data elements a first position in the re-ordered sequence that corresponds to the second sequence number, if the first position has not already been allocated, otherwise allocating a next available position.

26. The method of claim 19, further comprising receiving, from the second communication device, encrypted multimedia session data, and decrypting the encrypted multimedia session data to determine the pre-determined group size N and the pre-determined initialization value.

27. A communication device for receiving multimedia data, the communication device comprising a user interface, a multimedia processor, and a network communication interface configured to receive shuffled multimedia data from a remote multimedia server, wherein the multimedia processor is configured to:
    receive a series of media data elements from a second communication device, each media data element having a corresponding transmission sequence identifier;
    identify a first group of the media data elements, using the transmission sequence identifiers and a pre-determined group size;
    re-order the first group of media data elements from a first sequence corresponding to the transmission sequence identifiers to a re-ordered sequence, according to a de-shuffling function that depends on the transmission sequence identifiers, the pre-determined group size, and a pre-determined initialization value; and
    render the media data elements in the re-ordered sequence, using the user interface.

28. The communication device of claim 27, wherein the de-shuffling function comprises a one-way function of the sequence numbers, the pre-determined group size N, and the pre-determined initialization value.

29. The communication device of claim 27, wherein the multimedia processor is configured to identify the first group of the media data elements by identifying media data elements for which dividing sequence numbers corresponding to the transmission sequence identifiers by the pre-determined group size yields a quotient having an integer portion equal to a pre-determined group number.

30. The communication device of claim 27, wherein the multimedia processor is configured to re-order a first one of the media data elements by:
    calculating a hashing input value as a function of the pre-determined initialization value and a sequence number corresponding to the transmission sequence identifier for the first one of the media data elements;
    computing a hash output value from the hashing input value, using a cryptographic hashing algorithm;
    calculating an offset value based on the hash output value and the pre-determined group size N; and
    determining a position in the re-ordered sequence for the first one of the media data elements based on the offset value.

31. The communication device of claim 30, wherein the multimedia processor is configured to calculate the hashing input value by combining the pre-determined initialization value and the sequence number corresponding to the transmission sequence identifier for the first one of the media data elements, using an exclusive-OR operation, to obtain the hashing input value.

32. The communication device of claim 30, wherein the multimedia processor is configured to calculate the offset value by computing the modulo of the hash output value, using the pre-determined group size as the divisor.

33. The communication device of claim 30, wherein the multimedia processor is configured to determine the position in the re-ordered sequence for the first one of the media data elements based on the offset value by:
    adding the offset value to the sequence number for the first one of the media data elements to obtain a second sequence number; and
    allocating to the first one of the media data elements a first position in the re-ordered sequence that corresponds to the second sequence number, if the first position has not already been allocated, otherwise allocating a next available position.

34. The communication device of claim 27, wherein the multimedia processor is further configured to receive encrypted multimedia session data from the second communication device, via the network communication interface, and to decrypt the encrypted multimedia session data to determine the pre-determined group size N and the pre-determined initialization value.

* * * * *

UNITED STATES PATENT AND TRADEMARK OFFICE
CERTIFICATE OF CORRECTION

PATENT NO. : 8,204,217 B2
APPLICATION NO. : 12/361211
DATED : June 19, 2012
INVENTOR(S) : Ulf Björkengren and Stefan Ekenberg It is certified that error appears in the above-identified patent and that said Letters Patent is hereby corrected as shown below:

On the Title Page, Item (73), under "ASSIGNEE" delete "Telefonaktiebolaget LM Ericsson (publ), Plan-les-Ouates (CH)-" and insert --ST-Ericsson SA, Plan-les-Ouates (CH)--.

Signed and Sealed this
Fourth Day of June, 2013

Teresa Stanek Rea
*Acting Director of the United States Patent and Trademark Office*